United States Patent [19]

Duncanson et al.

[11] Patent Number: 4,700,358

[45] Date of Patent: Oct. 13, 1987

[54] SYNCHRONOUS/ASYNCHRONOUS MODEM

[75] Inventors: Jay P. Duncanson, San Francisco, Calif.; Mark R. Murray, Atlanta, Ga.

[73] Assignee: Hayes Microcomputer Products, Inc., Norcross, Ga.

[21] Appl. No.: 798,822

[22] Filed: Nov. 18, 1985

[51] Int. Cl.$^4$ ............................................. H04L 27/02
[52] U.S. Cl. ........................................ 375/8; 371/49; 375/111; 379/93; 379/97
[58] Field of Search ................. 178/2 R, 2 B, 3, 70 R; 179/2 C, 2 DP; 371/49, 47; 375/7, 8, 117, 36, 106, 111; 370/41, 43, 60; 340/347 DD, 825.14, 825.62; 379/93, 94, 96, 97, 98

[56] References Cited

U.S. PATENT DOCUMENTS

| | | | |
|---|---|---|---|
| 3,355,549 | 11/1967 | Alexander | 178/70 R |
| 3,681,529 | 8/1972 | Cooper | 178/70 R |
| 3,863,226 | 1/1975 | Ryburn | 364/900 |
| 3,975,712 | 8/1976 | Hepworth | 371/49 |
| 4,007,421 | 2/1977 | Lien | 375/111 |
| 4,035,580 | 7/1977 | Dieter et al. | 370/41 |
| 4,208,650 | 6/1980 | Horn | 371/49 |
| 4,291,198 | 9/1981 | Anderson et al. | 379/96 |
| 4,317,207 | 2/1982 | Fujimura et al. | 370/41 |
| 4,346,474 | 8/1982 | Sze | 371/49 |
| 4,387,440 | 6/1983 | Eaton | 379/94 |
| 4,482,996 | 11/1984 | Wilson et al. | 370/60 |
| 4,542,517 | 9/1985 | Goss et al. | 375/36 |
| 4,549,302 | 10/1985 | Heatherington | 179/2 DP |
| 4,586,159 | 4/1986 | Thomas et al. | 371/47 |
| 4,594,712 | 6/1986 | Perry | 371/49 |
| 4,656,654 | 4/1987 | Dumas | 379/96 |

OTHER PUBLICATIONS

Mitel Technical Data Advance Information for MT35213 Modem, Oct., 1985.
International Standard ISO-646-1973 (E).

Primary Examiner—Benedict V. Safourek
Attorney, Agent, or Firm—Jones, Askew & Lunsford

[57] ABSTRACT

An improved modem is described which can selectably operate in a synchronous communications mode, an asynchronous data mode, and an asynchronous command mode. A processor 47 controls the operation of the modem, adds starting and ending flags and frame check sequences to transmitted data, searches for flags and sync characters in received data, adds and deletes start, stop and parity bits required for communications with the asynchronous communications element 18, and performs zero bit insertion and deletion for HDLC/SDLC communications. Processor 47 also controls and monitors the operating parameters of the modem engine 60.

73 Claims, 5 Drawing Figures

SYNCHRONOUS/ASYNCHRONOUS MODEM

TECHNICAL FIELD

The present invention relates to transmission of information by synchronous and asynchronous communications methods, and particularly discloses an improved device for selectably transferring data by synchronous and asynchronous methods by using a microprocessor to perform asynchronous-to-synchronous and synchronous-to-asynchronous data format conversions.

BACKGROUND OF THE INVENTION

A modem (modulator-demodulator) is a device which allows communication between digital computing machines over voice-grade telephone lines. Although many digital communication schemes use asynchronous data transmission, there are also many computing machines which communicate by using synchronous data transmission. Synchronous data transmission is not, of itself, a problem since there are commercially available devices which provide both synchronous and asynchronous transmission.

In asynchronous communications, a character is sent by serially transmitting a number of bits according to a defined character format. In one typical character format, the first bit is called the start bit and signals the receiver that a data transmission follows. The next seven bits are called data bits and represent the character being transmitted. The next bit is often a parity bit, which is used to check for an error in the data bits. The last bit is called a stop bit, and signals the receiver that the data transmission has ended. Thus, each message contains one character. This sequence is then executed for the next character, and so on, until all the characters have been sent. A character may be, for example, a letter, a number, punctuation, or control information.

Various character formats are used. Typically, the number of data bits may be 5, 6, 7 or 8, the parity bit may signify even, odd, or no parity, or may be deleted, and there may be 1, 1½, or 2 stop bits. In addition, the speed at which the data is sent will typically be one of the following rates: 110, 150, 300, 600, 1200, 2400, 4800, 9600, or 19,200 bits per second (bps).

For two devices to communicate, they must both use the same character format and the same data rate in bits per second.

In synchronous communications, a message may contain many characters, instead of just one. In one typical synchronous message format, the first eight bits, commonly called the beginning flag, signals the start of a message. The next eight bits are address bits, and indicate the station for which the message is intended. The next series of bits represents the characters or information being transmitted. This series may be any reasonable length and is practically limited only by the number of bits that can normally be expected to be received before an error occurs. The next 16 bits are frame check sequence bits, which are used to detect errors. The last eight bits signal the end of the message, and are commonly called the ending flag. Thus, each message can contain many characters.

As in asynchronous communications, there are several different message formats and band rates commonly used in synchronous communications, and for two devices to communicate they must both use the same message format and the same bit rate.

Some computers have a slot for a communications card. The user may insert into this slot either a serial communications card, which is then connected to a modem engine, or a card which contains a complete modem. Typically, such cards support only asynchronous communications and contain an asynchronous communications element, such as the INS8250A manufactured by National Semiconductor Corporation, Santa Clara, Calif., a microprocessor, and the other components necessary for transmitting and receiving signals over a telephone line. The communication interface between the computer and a device on a card connected to the slot is normally asynchronous.

It is possible to manufacture a modem card which supports both synchronous and asynchronous communications by replacing the INS8250A with a combined synchronous/asynchronous communications controller such as, for example, the Z8530 manufactured by Zilog, Inc., Campbell, Calif. However, such communications controllers generally cost more than asynchronous communications elements, so modem manufacturers have been presented with three choices having cost/performance tradeoffs.

If a modem manufacturer decides to produce a modem with both synchronous and asynchronous capabilities, it will have to cut its costs or profit margin to stay competitive. Otherwise, potential customers who only need asynchronous capability will go to another manufacturer who sells asynchronous only modems for a lower price. Furthermore, addition of the synchronous capability may make the modem incompatible with some existing asynchronous date communication programs.

If the modem manufacturer produces only asynchronous modems, he stands to lose potential customers who need both synchronous and asynchronous capabilities.

If the modem manufacturer produces two modem models, one synchronous, and one asynchronous, then he is burdened with the cost and problems of running two production lines instead of just one.

Modem users were likewise faced with three choices: purchase an asynchronous-only modem, and forgo synchronous communications; purchase a synchronously-only modem, and forgo asynchronous communications; or purchase a synchronous/asynchronous modem, and pay a higher price.

There is therefore a need for a modem which uses an asynchronous communications element, supports both synchronous and asynchronous communications, is price-competitive with asynchronous-only modems, and which provides compatibility with existing asynchronous data communications programs.

Additionally, it is known that, in synchronous communications formats, data must be supplied at a rate adequate to assure data availability for a complete message as described above. It is also desirable to provide a standard interface to a synchronous/asynchronous communication which will allow the user to implement synchronous or asynchronous communications easily, by following a few simple rules, in a manner that is independent of the modem device used.

SUMMARY OF THE INVENTION

The present invention provides such an improved modem.

Broadly stated, the present invention provides a method by which a modem, using only those components required for asynchronous communications, can perform both synchronous and asynchronous communications and maintain compatibility with existing asynchronous data communication programs.

Also, the present invention may be broadly characterized as a method by which a microprocessor and an asynchronous communications element can generate and respond to the format, control and protocol signals required for both synchronous and asynchronous communications.

More particularly described, the present invention provides a method and apparatus by which a modem, having both a parallel bus input/output (I/O) port and a serial I/O port, can support both synchronous and asynchronous communications on the serial I/O port by using an asynchronous communications element to interface with the parallel bus and, by using a microprocessor to control the flow of data to and from the asynchronous communications element, to add, remove, and respond to protocol information, and to control the flow of data to and from the serial I/O port interface device (modem engine).

More particularly described, the present invention provides a method and apparatus for adding and deleting start, stop, and parity bits required for asynchronous communications and adding and deleting zero-bits required in some forms of synchronous communications.

Therefore, it is an object of the present invention to provide a means whereby an asynchronous communications element, a processor, and a modem engine can accommodate both synchronous and asynchronous communications.

It is another object of the present invention to provide a modem which can perform both synchronous and asynchronous communications at a lower cost than a modem which uses a synchronous/asynchronous communications element.

It is another object of the present invention to provide a modem which can selectably conduct communications in several different synchronous data formats.

It is another object of the present invention to use asynchronous communications control lines in a unique manner for the control of synchronous communications.

It is another object of the present invention to provide a means whereby modem control instructions can be inserted in a synchronous communications data stream at a first point and removed from said data stream at a second point in such a manner that the original data stream is preserved.

It is a further object of the present invention to provide a means whereby modem parameter status words can be inserted into a synchronous communications data stream at a first point and removed from said data stream at a second point in such a manner that the original data stream is preserved.

That the present invention accomplishes these objects will be made clear by the following detailed description of the preferred embodiment.

BRIEF DESCRIPTION OF THE DRAWINGS

FIG. 5 is a state diagram for the receiver of the preferred embodiment.

DETAILED DESCRIPTION

Figure 1:
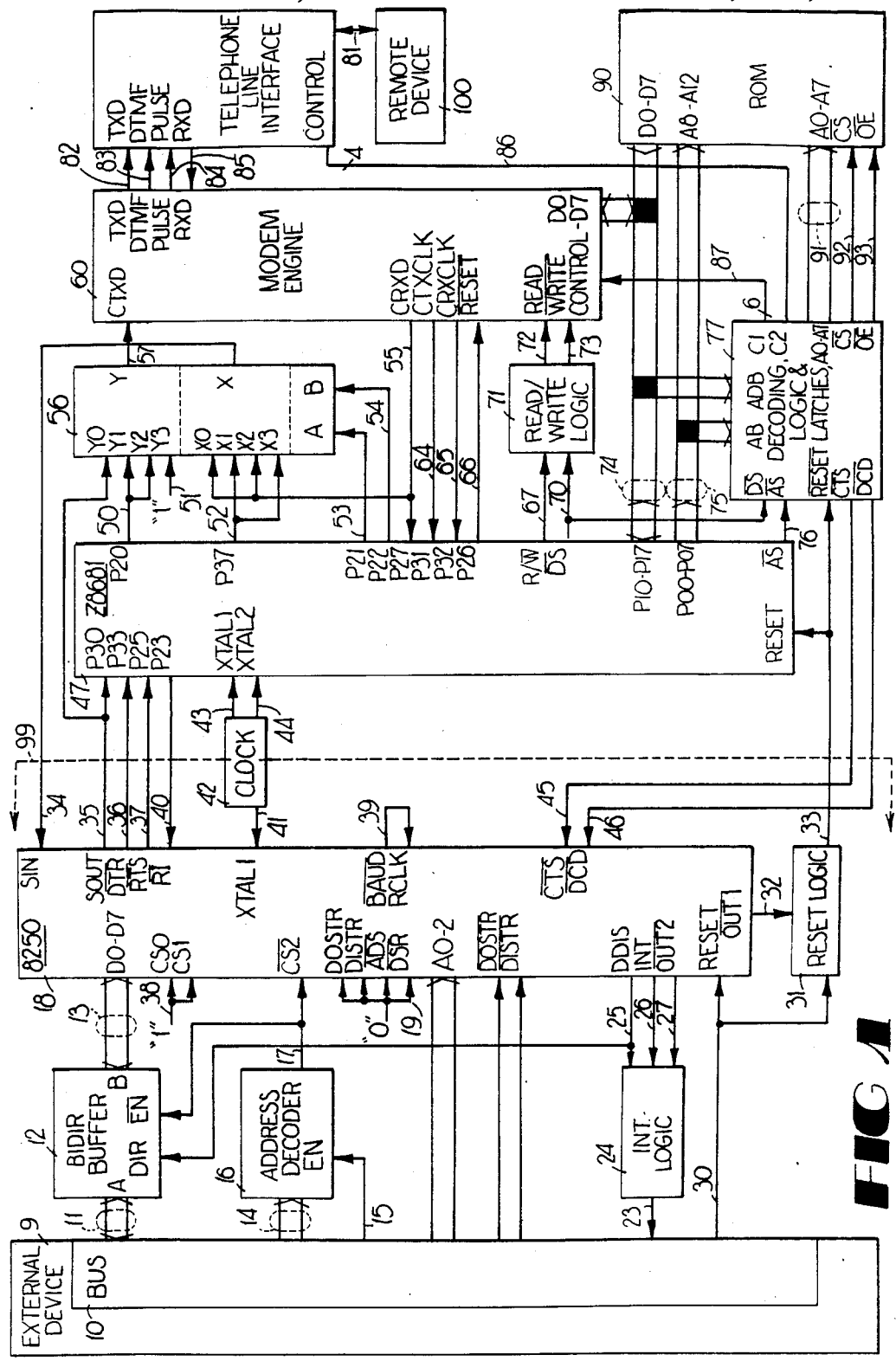
FIG. 1 is a schematic diagram of the preferred embodiment of the present invention.

Turning now to the drawings, in which like numerals represent like components throughout the several figures, FIG. 1 is a schematic diagram of the preferred embodiment of the present invention.

External device 9 is a computing device such as a computer, processor, or data terminal. The preferred embodiment of the present invention is designed to be used with an IBM Personal Computer. Therefore, it should be understood that external device 9, for the preferred embodiment, is an IBM PC. Details of the bus structure and signal timing for the IBM PC are well known to those skilled in the art, and are described in the "IBM PC Technical Reference Manual", published April 1984, which is hereby incorporated by reference. External device 9 has an input/output (I/O) bus 10 which carries both data and commands. Data bus 11 of I/O bus 10 consists of eight conductors for carrying an eight bit parallel word. Data bus 11 is connected to I/O Port A of a bidirectional tri-state buffer 12. I/O Port B of buffer 12 is connected by eight bit data bus 13 to the D0 through D7 lines of the I/O port of universal asynchronous receiver transmitter (UART) 18. UART 18 is also commonly called an asynchronous communications element (ACE). In the preferred embodiment UART 18 is the INS8250A device manufactured by the National Semiconductor Corporation, Santa Clara, Calif. Specific details of operation and internal structure of UART 18 are well known to those skilled in the art, are available in literature published by the manufacturer, National Semiconductor Corporation, and are not described in detail herein.

Address bus 14 is connected to the inputs of an address decoder 16. Enable signal conductor 15 is connected to the enable input of address decoder 16. The output of address decoder 16 is connected by conductor 17 to the negated enable input of buffer 12, which enables the outputs of buffer 12, and the negated chip select 2 (CS2) input of UART 18. The chip select 0 and 1 (CS0, CS1) inputs of UART 18 are connected to a logic 1 by conductor 38.

Address bus 20 is connected to the A0–A2 address inputs of UART 18. This allows external device 9 to select the register of UART 18 that data is to be read from or written into. Data input strobe (DISTR) conductor 22 is connected to the negated data input strobe input of UART 18. Data output strobe (DOSTR) conductor 21 is connected to the negated data output strobe input of UART 18. The negated address strobe (ADS) input, the normal data input strobe input, the normal data output strobe input, and the negated data set ready input of UART 18 are connected to a logic 0 by conductor 19.

It will be appreciated by one skilled in the art that data bus 11, address buses 14 and 20, address enable line 15, and the data strobes on conductors 21 and 22 are used in a straightforward manner to transfer data between external device 9 and UART 18.

It will be appreciated by one skilled in the art, or from a reading of the manufacturer's literature on UART 18, that UART 18 has eleven accessible registers. External device 9 sends commands to UART 18 by writing data into these registers, and reads the status of UART 18 by reading the data contained in these registers.

The driver disable (DDIS) output of UART 18 is connected by conductor 25 to the data direction (DIR) input of buffer 12 and a first input of interrupt logic circuitry 24. UART 18 places a logic 0 onto conductor 25 when data is being read from data port D0-D7 of UART 18. A logic 0 on conductor 25 instructs buffer 12 that Port B is the input and Port A is the output. A logic 0 on conductor 25 also disables interrupt logic 24. A logic 1 on conductor 25 allows data to be transferred from UART 18 to external device 9, and enables interrupt logic 24. It will be appreciated from the manufacturer's literature that the DDIS output of UART 18 is a logic 0 when data is being read from UART 18 onto data bus 13.

The negated second output (OUT2) and the interrupt output (INT) of UART 18 are connected by conductors 27 and 26, respectively, to a second and third inputs, respectively, of tri-state interrupt logic 24. If UART 18 places a logic 1 onto conductor 27 interrupt logic 24 will have a high-impedance output. If UART 18 places a logic 1 onto conductor 25 and a logic 0 onto conductor 27, the output of interrupt logic 24 will follow the interrupt output of UART 18. The output of interrupt logic 24 is connected by conductor 23 to bus 10. The OUT2 signal placed on conductor 27 by UART 18 is controlled by external device 9 by a command to UART 18. Therefore, external device 9 can enable or disable the interrupt capabilities of UART 18.

Reset conductor 30 of bus 10 is connected to the reset input of UART 18 and to a first input of reset logic 31. The negated first output (OUT1) of UART 18 is connected by conductor 32 to a second input of reset logic 31. The output of reset logic 31 is connected by conductor 33 to the negated reset input of processor 47 and the negated reset input of decoding logic and latches 77. A logic 1 on conductor 30 resets UART 18, processor 47, and decoding logic 77.

Additionally, external device 9 may command UART 18 to place a logic 0 on conductor 32 and reset processor 47 and decoding logic 77. Reset logic 31 provides a single 10 microsecond pulse output whenever a logic 1 is present on conductor 30 or a logic 0 is present on conductor 32. Methods of construction of reset logic 31 are well known to those skilled in the art.

A first output of clock 42 is connected by conductor 41 to the XTAL1 input of UART 18. The frequency of this first output is 1.843 MHz in the preferred embodiment. A second output of clock 42 is connected by conductor 43 to the XTAL1 input of processor 47. The complement of this second output is connected by conductor 44 to the XTAL2 input of processor 47. In the preferred embodiment, the frequency of this second output is 7.372 MHz.

Processor 47 is a microprocessor such as the Z8681 manufactured by Zilog, Inc., Campbell, Calif. Processor 47 has four 8-bit ports, referred to as Port 0 (P00-P07), Port 1 (P10-P17), Port 2 (P20-P27) and Port 3 (P30-P37). Details of operation of the Z8681 are available from the manufacturer.

The asynchronous serial data output (SOUT) of UART 18 is connected by conductor 35 to the P30 input of processor 47 and the Y0 input of a dual four-to-one multiplexer 56. The P20 output of processor 47 is connected by conductor 50 to the Y1 and Y2 inputs of multiplexer 56. The Y3 input of multiplexer 56 is connected to a logic 1 by conductor 51. The Y output of multiplexer 56 is connected by conductor 57 to the transmit data input (CTXD) of modem engine 60.

It will be readily seen that the data presented to the CTXD input of modem engine 60 may be selected to be the SOUT data from UART 18, the P20 data from processor 47, or the logic 1 on conductor 51. This selection and routing of the data to be transmitted allows the proper format and protocol to be selected for both synchronous and asynchronous transmission of data.

The received data output (CRXD) of modem engine 60 is connected by conductor 55 to the P27 input of processor 47 and the X0 and X2 inputs of multiplexer 56. The P37 output of processor 47 is connected by conductor 52 to the X1 and X3 inputs of multiplexer 56. The X output of multiplexer 56 is connected by conductor 34 to the asynchronous serial data input (SIN) of UART 18.

It will also be readily seen that the received data output by modem engine 60 may be selectively routed directly to the SIN input of UART 18 or indirectly through processor 47. This selection and routing of the received data allows the proper format and protocol to be selected for both synchronous and asynchronous reception of data.

Modem engine 60 contains a modulator, demodulator, clocks, operating status and operating control logic and registers. Methods of construction of modem engine 60 are well known to those skilled in the art. In particular, modem engine 60 may be implemented by one of more modem chip sets which are currently available or may be constructed using MSI and LSI integrated circuits.

Modem engine 60 has two clock outputs: the transmit data clock (CTXCLK) and the received data clock (CRXCLK). The CTXCLK output is connected by conductor 64 to the P31 input of processor 47 and is used to synchronize the transfer of transmit data from processor 47 to modem engine 60. The CRXCLK output is connected by conductor 65 to the P32 input of processor 47 and is used to synchronize the transfer of received data from modem engine 60 to processor 47. The CTXCLK output and CRXCLK output are only used in the synchronous mode.

The P21 and P22 outputs of processor 47 are connected by conductors 53 and 54, respectively, to the A and B control inputs, respectively, of multiplexer 56. Processor 47 therefore controls the operation of multiplexer 56 according to whether synchronous or asynchronous operation is desired.

The P26 output of processor 47 is connected by conductor 66 to the negated reset input of modem engine 60. The read/negated write (R/W) output of processor 47 is connected by conductor 67 to a first input of read/write logic circuit 71. The negated data strobe (DS) output of processor 47 is connected by conductor 70 to a second input of read/write logic 71 and to the negated data strobe (DS) input of decoding logic 77. The read output of read/write logic 71 is connected by conductor 72 to the read input of modem engine 60. The negated write output of read/write logic 71 is connected by conductor 73 to the negated write input of modem engine 60. Read/write logic 71 converts the single read/write signal on conductor 67 into two separate signals on conductors 72 and 73. Read/write logic 71 is enabled by a logic 0 on conductor 70.

The P10-P17 inputs/outputs of processor 47 are connected by eight bit bidirectional data bus 74 to the D0-D7 inputs/outputs of modem engine 60, the address/data bus (ADB) inputs of decoding logic 77, and the D0-D7 outputs of read only memory (ROM) 90.

Modem engine 60 has operating status registers and operational control registers. Read/write logic 71, decoding logic 77, and data bus 74 allow processor 47 to read from/write into the registers in modem engine 60 and therefore to monitor and control the operation of modem engine 60.

The P00-P07 outputs of processor 47 are connected by eight bit address bus 75 to the address bus (AB) inputs of decoding logic 77 and to the five most significant bit address inputs (A8-A12) of ROM 90. The negated address strobe (AS) output of processor 47 is connected by conductor 76 to the negated address strobe input of decoding logic 77. Decoding logic 77 accepts the signals present on address/data bus 74 and address bus 75 to provide several output signals.

The first control output (C1) of decoding logic 77 is connected by a six-wire conductor 87 to the six control inputs of modem engine 60. In the preferred embodiment, these six control inputs are used for selecting and enabling a particular register in modem engine 60 for read or write operations.

The second control (C2) output of decoding logic is connected by a four-wire conductor 86 to the four control inputs of telephone line interface 80 for contolling the switchhook (not shown) connection to the telephone line 81, connecting or disconnecting another device (not shown) to telephone line 81, etc.

The modulated transmit data output (TXD) of modem engine 60 is connected by conductor 82 to the modulatd transmit data input (TXD) of line interface 80. The modulated received data output (RXD) of line interface 80 is connected by conductor 85 to the modulated received data input of modem engine 60. The telephone line terminals (TIP and RING) of line interface 80 are connected to telephone line 81. Since telephone line 81 is a bidirectional serial data transfer means, line interface 80 contains a duplexer (not shown) for placing the TXD signal onto telephone line and retrieving the RXD signal from telephone line 81.

Modem engine 60 contains a dual tone multiple frequency (DTMF) tone generator for tone dialing of telephone numbers. The DTMF output of modem engine 60 is connected by conductor 83 to the DTMF input of line interface 80. Line interface 80 places these DTMF signals onto telephone line 81. Modem engine 60 also contains a pulse generator for pulse dialing of telephone numbers. The pulse output of modem engine 60 is connected by conductor 84 to the pulse input of line interface 80. Line interface 80 also places these pulse dial signals onto telephone line 81. Methods of construction of line interface 80 are well known to those skilled in the art.

Telephone line 81 is connected to the telephone terminals of remote device 100. Remote device 100 is typically data terminal equipment with a synchronous and-/or asynchronous modem. It will be appreciated that the purpose of the present invention is to allow external device 9 to communicate, either synchronously or asynchronously, with remote device 100.

Decoding logic 77 also allows processor 47 to read data from ROM 90. The address outputs (A0-A7) of decoding logic are connected by ROM address bus 91 to the lower eight bit (A0-A7) inputs of ROM 90. The negated chip select output of decoding logic 77 is connected by conductor 92 to the negated chip select input of ROM 90. The negated output enable output (OE) of decoding logic 77 is connected by conductor 93 to the negated output enable input of ROM 90. Decoding logic 77 provides the appropriate signals on bus 90 and conductors 92 and 93 which, in conjunction with the signals on bus 75, allows processor 47 to read data from ROM 90 via bus 74. Methods of construction of decoding logic 77 for controlling the reading of data from ROMs are well known. It will be appreciated that ROM 90 contains operating instructions and data constants for processor 47.

The negated clear-to-send (CTS) output of decoding logic 77 is connected by conductor 45 to the negated CTS input of UART 18. The negated CTS signal is used to control the flow of data from UART 18 to processor 47 in the synchronous mode. When processor 47 is ready to accept more data (via SOUT) from UART 18, processor 47 places signals on buses 74 and 75 and conductors 70 and 76 to cause decoding logic 77 to place a logic 0 on the negated CTS conductor 45.

The negated data carrier detect (DCD) output of decoding logic 77 is connected by conductor 46 to the negated DCD input of UART 18. The presence on telephone line 81 of a data carrier from remote device 100 is detected by modem engine 60 and causes modem engine 60 to raise the data carrier detected (DCD) flag in one of its status registers. Processor 47 periodically reads the status registers of modem engine 60. If the DCD flag in modem engine 60 has been raised, processor 47 will cause decoding logic 77 to place a logic 0 onto conductor 46. A logic 0 on conductor 46 raises the DCD flag in the status register of UART 18. Whenever the DCD flag in UART 18 is raised or lowered, UART 18 will generate an interrupt. External device 9 will service the interrupt, read the status register of UART 18 and thereby determine the change in the data carrier on line 81.

Assume that a 2400 bps synchronous communications mode has been selected. Data will be received from remote device 100 by modem engine 60 at 2400 bits per second. The demodulated data will then be routed by multiplexer 56 to processor 47 at this rate. Processor 47 will then decode the received data, add start, stop and parity bits, and asynchronously send the received data to the SIN input of UART 18 via multiplexer 56. The synchronous received data is being sent from modem engine 60 to processor 47 at the rate of 2400 bps. Processor 47 must perform the appropriate zero-bit deletion and NRZ/NRZI decoding of the incoming data, add start, stop and parity bits to the processed data, and asynchronously send the data to UART 18. Furthermore, as explained below, processor 47 may need to insert one or more status words into the data stream to UART 18. Since processor 47 must send more bits to UART 18 than processor 47 receives from modem engine 60, the data transfer rate between processor 47 and UART 18 must be greater than the data transfer rate between modem engine 60 and processor 47. In the preferred embodiment, the data transfer rate between processor 47 and UART 18 was selected to be 9600 bps.

Processor 47 must wait until a complete data word has been received from modem engine 60 before processor 47 can add the additional bits necessary for asynchronous transmission to UART 18. This means that the received data will be available from UART 18 approximately 1 millisecond after the modulated data was received by modem engine 60. UART 18 will geenrate an interrupt when a data word has been received from processor 47. External device 9 must then service this interrupt in order to read the new data word from UART 18. External device 9 should therefore rapidly service the interrupt from UART 18 and read the data in UART 18. Excessive delays in servicing the interrupt or reading the data from UART 18 may cause problems when resetting processor 47 into the hunt state in the BSC mode, explained below, in sending an abort signal in the HDLC/SDLC modes, also explained below, or cause received data to be lost.

Likewise, UART 18 asynchronously sends transmit data to processor 47 at 9600 bps. Processor 47 must delete the start, stop, and parity bits, encode the data, and send the data to modem engine 60 at 2400 bps. Processor 47 has limited data storage space and, since data is being received from UART 18 at 9600 bps and sent to modem engine at 2400 bps, processor 47 requires a means for interrupting the data flow from UART 18. The CTS conductor 45 is used for handshaking between UART 18 and processor 47 so that the effective throughput of data into processor 47 from UART 18 is approximately equal to the throughput of data from processor 47 to modem engine 60.

The negated data terminal ready (DTR) output of UART 18 is connected by conductor 36 to the P33 intput of processor 47. The negated ready to send (RTS) output of UART 18 is connected by conductor 37 to the P25 input of processor 47. The P23 output of processor 47 is connected by conductor 40 to the negated ring indicator (RI) input of UART 18. The use of these signals is explained below.

The negated baud output (BAUD) of UART 18 is connected by conductor 39 to the receiver clock input (RCLK) of UART 18. This connection causes UART 18 to use the same bit rate for transmission and reception of data as processor 47.

Other Implementations

The preferred embodiment of FIG. 1 is shown connected to the parallel data bus 10 of an external device 9. However, it will be appreciated that, in some applications, external device 9 may include the components to the left of dashed line 99 and have a standard RS-232 interface (conductors 34, 35, 36, 37, 40, 45 and 46). In this application, since reset conductor 33 will probably not be available, software is used to instruct processor 47 to reset, either internally or by adding an addressable reset output to decoding logic 77. Also, the composite external device 9 must be programmed to recognize the different meanings of signals on some of these conductors. The present invention is therefore not limited to use with external devices 9 having an accessible parallel data bus.

Programming

In the preferred embodiment, the meaning of some of the input signals and output signals of UART 18 is not the standard RS-232 meaning. Therefore, external device 9 is programmed to recognize the following meanings of those signals. In the synchronous mode, processor 47 processes both transmit data and received data. It may therefore be thought of as containing a serial in, serial out transmitted data processor and a serial in, serial out received data procesor which, for convenience, will be referred to as a transmitter and receiver, respectively.

The DTR signal on conductor 36 instructs processor 47 to exit the synchronous mode and enter the asynchronous command mode. When processor 47 switches from the synchronous mode to the asynchronous command mode processor 47 must also instruct modem engine 60 and line interface 80 as to whether the connection to remote device 100 via telephone line 81 should be maintained or broken. Therefore, external device 9 must have previously sent an instruction to processor 47 to maintain or break this connection, as desired by the user.

The RTS signal on conductor 37 instructs processor 47 to reset the receiver in processor 47 (force the receiver to enter the hunt state). The RI signal on conductor 40 advises external device 9 that an end-of-frame is being transmitted and that the transmitter in processor 47 is about to enter the idle state.

The CTS signal on conductor 45 advises external device 9 that processor 47 is presently unable to accept any more data to be transmitted. The DCD signal on conductor 46 advises external device 9 that modem engine 60 has detected a data carrier on telephone line 81.

External device 9 programs UART 18 to generate an interrupt on a change in state of the RI, CTS, and DCD signals. External device 9 must also instruct processor 47 as to the programming of modem engine 60.

As will be explained below, processor 47 occasionally sends status words to external device 9 via UART 18. In the preferred embodiment the status words contain the following information: end of frame received and frame check sequence is good; end of frame received and frame check sequence is bad; receiving flag-idle; receiving mark-idle; exiting synchronous mode; entering synchronous mode; RTS command acknowledged (receiver of processor 47 has been reset); and abort signal in received data.

Asynchronous Data Operation-General

In asynchronous data operation, processor 47 places a logic 0 on conductors 53 and 54. This causes multiplexer 56 to connect its Y0 input to its Y output, and its X0 input to its X output. This connects the transmit data output (SOUT) of UART 18 to the transmit data input (CTXD) of modem engine 60, and connects the receive data output (CRXD) of modem engine 60 to the receive data input (SIN) of UART 18. Therefore the transmitted and received data is transferred between UART 18 and modem engine 60 without being affected by processor 47. Data transfer between UART 18 and modem engine 60 is asynchronous and the transmit data clock (CTXCLK) and the receive data clock (CRXCLK) provided by modem engine 60 on conductors 64 and 65, respectively, are not used by UART 18.

Transmit data from UART 18 on conductor 35, and receive data from modem engine 60 on conductor 55, is monitored by processor 47 for escape sequences, operating instructions, etc.

Asynchronous Command Operation-General

External device 9 instructs processor 47 to enter the asynchronous command mode by causing UART 18 to place a logic 0 onto DTR conductor 36, or by a command sent via the SOUT output of UART 18. Processor 47 will also enter the asynchronous command mode when power is first applied. Once processor 47 has entered the asynchronous command mode, external device 9 programs processor 47 by writing the appropriate data into the operating control registers of processor 47. External device 9 accomplishes this by writing the appropriate command words into the transmit buffer register of UART 18. UART 18 will then asynchronously send these command words to processor 47.

Since processor 47 is in the asynchronous command mode, processor 47 will interpret these words as commands and respond accordingly. This technique is also used to allow external device 9 to command processor 47 to program modem engine 60 with the desired operating parameters.

Synchronous Operation-General

In synchronous operation, processor 47 places a logic 0 on conductor 53 and a logic 1 on conductor 54. Multiplexer 56 therefore connects its Y1 input to its Y output and its X1 input to its X output.

Transmit data flows from UART 18 to processor 47 over conductor 35, is processed by processor 47, and then flows from processor 47 to modem engine 60 through conductor 50, multiplexer 56, and conductor 57, Receive data flows from modem engine 60 to processor 47 over conductor 55, is processed by processor 47, and then flows from processor 47 to UART 18 through conductor 52, multiplexer 56, and conductor 34.

In synchronous operation, data flows asynchronously between UART 18 and processor 47, and synchronously between processor 47 and modem engine 60.

When the transmit buffer in UART 18 is empty, i.e.—the last transmit word in UART 18 has been sent to processor 47, UART 18 generates an interrupt. This causes external device 9 to read the interrupt and send, over bus 10, the next transmit word to UART 18. Transmit data flow control from external device 9 to processor 47 is accomplished asynchronously by use of the CTS input of UART 18 on conductor 45. Each time processor 47 changes the state of the CTS signal on conductor 45, UART 18 will generate an interrupt. External device 9 services the interrupt and determines the state of the CTS signal on conductor 45. When processor 47 is ready for more data, it places a logic 0 on conductor 45. This advises external device 9 to send, via UART 18, the next transmit character word to processor 47. When processor 47 is unable to accept more data, it places a logic 1 on conductor 45, thereby advising external device 9 to stop sending any more character words to procesor 47 via UART 18. The CTS signal on conductor 45 has no effect upon the SOUT transmitter of UART 18. It will be appreciated that at finite delay will occur between the time processor 47 changes the CTS signal and the time that external device 9 will service the interrupt and react in the proper manner.

If processor 47 had only a one word transmit buffer then, because of the delay, processor 47 could run out of transmit data and incorrectly being sending an end-of-frame or, transmit data may be lost because of overwriting of the transmit buffer since UART 18 automatically sends out any transmit data in its transmitter holding register. In order to prevent these undesirable conditions from occurring, processor 47 is programmed to have a four word transmit FIFO buffer. The four word transmit FIFO buffer compensates for the delay time so that the probability of an occurrence of an incorrect end-of-frame transmission or overwriting of transmit data words is substantially reduced.

Processor 47 causes decoding logic 77 to place a logic 0 on CTS conductor 45 when one or two words are left in the transmit FIFO buffer, and a logic 1 on CTS conductor 45 when the transmit FIFO buffer contains more than two words. It should be noted that if the transmit FIFO buffer of processor 47 becomes empty an end-of-frame sequence will be sent by processor 47 to modem engine 60.

UART 18 places an interrupt signal (logic 1) on conductor 26 when the negated CTS signal changes state. This causes interrupt logic 24 to place an interrupt signal on conductor 23 of bus 10. When external device 9 sees an interrupt signal on conductor 23 it therefore requests an interrupt status word (reads the contents of the interrupt identification register) from UART 18. External device 9 therefore monitors the status of the negated CTS signal through UART 18.

When the negated CTS signal on conductor 45 becomes a logic 0, external device 9 must not delay too long before sending the next transmit character to UART 18 because as previously stated, processor 47 will send an end-of-frame to modem engine 60 if the transmit FIFO buffer becomes empty. If the transmit FIFO buffer becomes empty, processor 47 will also place a logic 1 on negated ring indicator (RI) conductor 40. This also causes UART 18 to generate an interrupt signal on conductor 23. External device 9, in response to the interrupt signal, requests the interrupt status word from UART 18. External device 9 can therefore determine that and end-of-frame is being sent.

If external device 9 detects that an end-of-frame is incorrectly being sent, i.e., the message to be sent had not been completed, then external device 9 places on bus 10 an instruction (BREAK) to UART 18 which causes UART 18 to send an abort character to processor 47. Processor 47, which is still sending the end-of-frame sequence to modem engine 60, stops sending the end-of-frame, and then sends the abort character to modem engine 60. The abort character advises remote device 100 that there has been an error in the message transmitted to it. External device 9 should be configured to then cause the message to be transmitted again.

Synchronous transmit data flow from processor 47 to modem engine 50 is accomplished by use of the transmit data clock (CTXCLK) output of modem engine 60 on conductor 64. Each clock pulse on conductor 64 causes processor 47 to place one bit of the transmit word contained in the transmit FIFO buffer onto conductor 50, which is connected to the serial data input (CTXD) of modem engine 60.

After all the bits in a transmit word in the transmit FIFO buffer have been sent, processor 47 then begins sending the bits of the next transmit word in the transmit FIFO buffer. Once all the transmit words in the transmit FIFO buffer have been clocked out to modem engine 60, and no new words have been received, so that the transmit FIFO buffer is empty, processor 47 then begins sending an end-of-2frame to modem engine 60.

Synchronous receive data flow from modem engine 60 to processor 47 is achieved by the receive data clock (CRXCLK) output of modem engine 60 on conductor 65. Each clock pulse on conductor 65 clocks one bit of the receive data word into processor 47. Processor 47 also has a four word receive FIFO buffer. After all the bits in one receive word have been received by processor 47, processor 47 places the word into the receive FIFO buffer, processor 47 then begins assembling the next receive word.

Receive data flow from processor 47 to UART 18 is asynchronous. As soon as processor 47 has assembled a receive word and moved it through the receive FIFO buffer, processor 47 sends the word, in asynchronous format, to UART 18 via conductor 52, multiplexer 56, and conductor 34.

When UART 18 has received a complete word form processor 47, UART 18 generates an interrupt which causes external device 9 to service the interrupt and read the received word.

Synchronous Formats

Processor 47 processes the transmit words and receive words according to the synchronous format selected. Numerous synchronous data formats have been developed. High level data link control (HDLC), synchronous data link control (SDLC), and binary synchronous communications (BSC) formats were selected for the preferred embodiment since these are the most widely used formats. However, it will be appreciated that other synchronous data formats can also be readily implemented.

Figure 2:
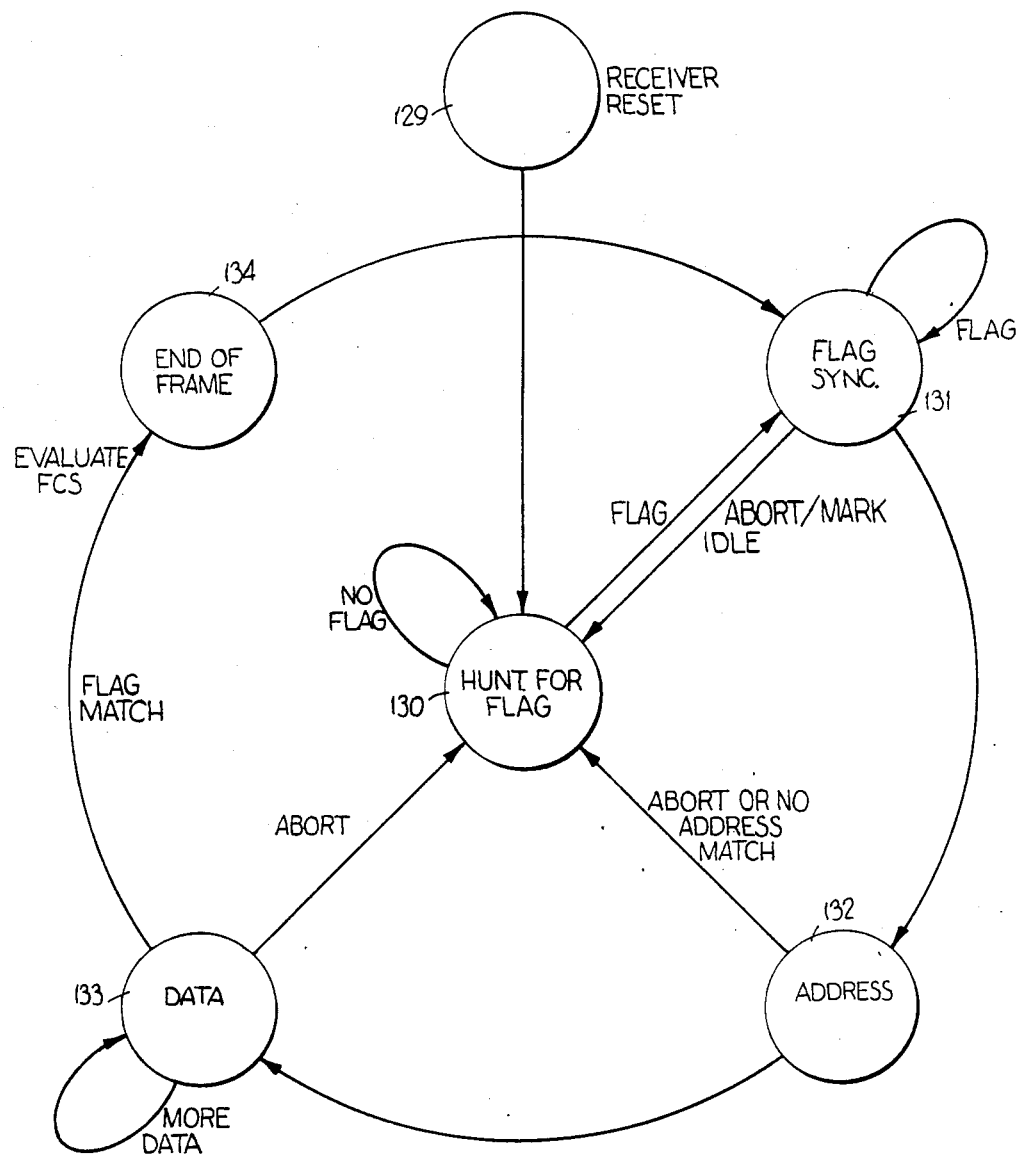
FIG. 2 is an illustration of the HDLC/SDLC data format.

The frame structure of HDLC and SDLC operation is shown in FIG. 2. The HDLC/SDLC flag character 101 has the binary value 01111110. The address character 102 is the address of the station for which the message is intended.

In the receive data mode, processor 47 may be instructed by external device 9 to examine or ignore the address character 102. If processor 47 is instructed to examine address character 102 then, if the address character 102 matches neither the user's station address nor the broadcast address (binary 11111111), then processor 47 will not send any of the message to external device 9. If the address character 102 matches either the user's station address or the broadcast address, or if processor 47 is instructed to ignore address character 102, then processor 47 treats address character 102 as data and sends the entire message to external device 9.

In the receive mode, processor 47 processes and sends the N data bits 103 and the frame check sequence (FCS) 104 to external device 9. Since N is an unspecified variable, processor 47 cannot tell the difference between data 103 and FCS 104 until the ending flag 105 is received. Flag 105 is identical to flag 101. By definition, FCS 104 is the 16 bits immediately preceding flag 105. Therefore, when flag 105 is detected by processor 47, processor 47 completes the sending of data 103 and FCS 104 to external device 9, compares the results of its FCS calculations for the received data 103 with FCS 104, and sends a status word to external device 9. The status word advises external device 9 that an end-of-frame has been received and whether the FCS comparison was good or not good.

In the transmit data mode, external device 9 generates address character 102 and processor 47 processes address character 102 exactly as data 103.

In the transmit mode, processor 47 generates FCS 104 and flag 105 when the transmit FIFO buffer becomes empty. As previously explained, when the transmit FIFO buffer becomes empty processor 47 also notifies external device 9 that an end-of-frame is being sent. It will be appreciated that an end-of-frame sequence consists of FCS 104 and flag 105. Therefore, if processor 47 begins generating an end-of-frame sequence and the message was not complete, external device 9 must send the abort signal to processor 47 before flag 105 has been completely sent.

Figures 3, 4:
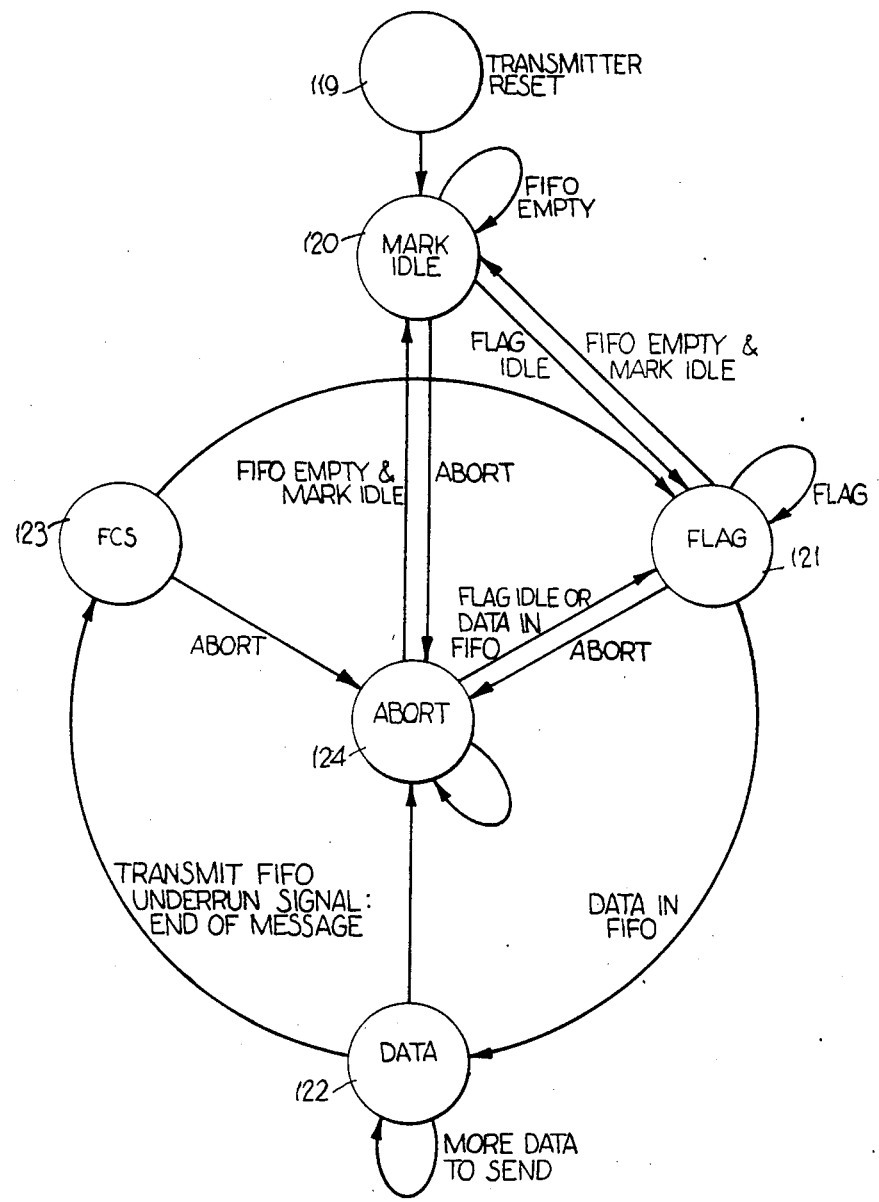
FIG. 3 is an illustration of the BSC data format.
FIG. 4 is a state diagram for the transmitter of the preferred embodiment.

The frame structure of the BSC format is shown in FIG. 3. The synchronization characters 110 and 111 are always identical and are programmable. External device 9 instructs processor 47 as to the value of sync characters 110 and 111. Each of the N data characters 112a–112n is 8 bits in length.

In the transmit mode, when processor 47 receives the first data character 112a from external device 9, processor 47 generates and sends sync characters 110 and 111 to modem engine 60 and then begins sending data 112 to modem engine 60. If the transmit FIFO buffer becomes empty, processor 47 generates and sends mark-idle or sync characters, as selected under the control of external device 9.

In the BSC mode, processor 47 notifies external device 9 via RI conductor 40 and UART 18 that the transmit FIFO buffer is empty but does not generate the end-of-frame sequence (CRC (Cyclic Redundancy Check) 113 and PAD 114). External device 9 generates the end-of-frame and sends it to processor 47. Processor 47 then sends the end-of-frame sequence to modem engine 60 as if it were data. The Pad 114 has the binary value 11111111.

In the receive mode, processor 47 starts in the hunt state. Therefore, processor 47 does not initially send any received data to external device 9 until it has detected sync characters 110 and 111. Processor 47 strips sync characters 110 and 111 from the received message and then sends the remainder of the received mesage to external device 9.

Although it is possible, processor 47 does not detect an end-of-frame sequence because of time and ROM 90 space limitations. Therefore, processor 47 will send to external device 9 the CRC 113, Pad 114, and all parts of any following frames, including sync flags 110 and 111, until external device 9 instructs processor 47 to re-enter the hunt state.

In the receive mode, processor 47 stays in the hunt state and does not send the received word to the external device until flag 101 has been received. Processor 47 will re-enter the hunt state after an abort sequence is received or external device 9 instructs processor 47 to re-enter the hunt state.

In the preferred embodiment, external device 9 instructs processor 47 to re-enter the hunt state by sending an instruction to UART 18, over bus 10, which causes UART 18 to place a logic 0 on the negated request-to-send (RTS) conductor 37. This instruction to re-enter the hunt state is valid for HDLC, SDLC, and BSC formats. Processor 47 acknowledges the hunt instruction by sending a status word to external device 9 via UART 18.

Once processor 47 is in the hunt state, it remains in the hunt state and does not send any received data to external device 9 until processor 47 detects the two sync characters 111 and 112 which are followed by something other than a mark/idle character.

Therefore, external device 9 must check the incoming data stream to detect and separate CRC 113 and Pad 114 from data 112 and also instruct processor 47 to re-enter the hunt state.

It will be appreciated that, since communications between processor 47 and UART 18 are asynchronous, UART 18 will add start, stop, and parity bits to a transmit word on bus 10 before sending the transmit word to processor 47. These additional bits must be removed from the transmit word for synchronous transmission. Therefore, before sending any transmit word to modem engine 60, processor 47 removes the start, stop and parity bits.

Similarly, in the receive mode, processor 47 adds start, stop, and parity bits to each received word from modem engine 60 before sending the received word to UART 18. UART 18 then deletes the start, stop and parity bits before placing the received word on bus 10.

In the HDLC and SDLC modes of operation, processor 47 also performs zero bit insertion on transmitted words and zero bit deletion on received words. It will be appreciated that zero bit insertion/deletion is required in HDLC and SDLC modes to prevent a combination of address 102 and/or data 103 characters from having the binary value of a flag 101 or 105. Processor 47 therefore counts the number of consecutive logic 1's in the transmit data word from UART 18. After processor 47 counts five consecutive logic 1's, it inserts a logic 0 into the transmit word to modem engine 60. Accordingly, on received data from modem engine 60, processor 47 wil delete any logic 0 which follows five consecutive logic 1's.

Zeros are not inserted or deleted from flags 101 and 105 or from an abort sequence (binary value 1111 1111). When processor 47 detects an abort sequence in the received word, it causes UART 18 to generate an interrupt to external device 9 and also disregards the remainder of the frame which was interrupted by the abort sequence.

There is no zero-bit insertion/deletion requirement in the BSC mode of operation.

Processor 47 is instructed by external device 9 whether the non-return-to-zero (NRZ) or non-return-to-zero, inverter (NRZI) encoding is to be used. Processor 47 therefore performs NRZ or NRZI encoding, as appropriate, on the transmit word before sending it to modem engine 60, and performs NRZ or NRZI decoding, as appropriate, on the received word before sending it to UART 18.

State Diagrams

FIG. 4 is a state diagram of the HDLC/SDLC transmitter. The HDLC/SDLC transmitter has five states: Mark-Idle 120, Flag 121, Data 122, FCS 123, and Abort 124. A transmitter reset command 119 causes the transmitter to enter mark idle state 120.

The transmitter selectably assumes either mark-idle state 120 or flag state 121 when the transmitter is idle, i.e.—there is no data to be transmitted. In mark-idle state 120 the transmitter places and holds a logic 1 on output P20. An abort command (BREAK SIGNAL) from external device 9 will have no effect upon the transmitter in this state. The transmitter will advance to flag state 121 upon receipt from UART 18 of data to be transmitted.

In flag state 121 the transmitter continuously generates and sends the HDLC/SDLC flag character. The transmitter may be commanded by external device 9, through UART 18, to enter the abort state 124. Once the abort command has been processed and the abort character sent, the transmitter will resume sending flag characters. The transmitter will advance to data state 122 upon receipt from UART 18 of data to be transmitted. If flag state 121 has been entered from mark-idle state 120 as a result of receiving from UART 18 data to be transmitted, then the transmitter will remain in flag state 121 only long enough to transmit the opening flag and then advance to data state 122.

In data state 122 the transmitter continuously accept data from UART 18 to be transmitted, performs zero-bit insertion as required, places the data on output P20, and updates the FCS (frame check sequence). If the transmitter runs out of data to send, it advances to FCS state 123. If external device 9 sends the abort command, the transmitter advances to abort state 124.

In FCS state 123 the transmitter freezes the FCS, performs zero bit insertions as required, and places the FCS data onto output P20. Once the FCS data has been sent, the transmitter advances to flag state 121 to transmit the closing flag. If flag-idle state 121 has been selected the transmitter will continue sending the flag-idle character. If mark idle state 120 has been selected the transmitter will advance to mark idle state 120 after the closing flag is sent.

Abort state 124 may be entered from any of the states, including reentry from abort state 124. In abort state 124, the transmitter sends an abort sequence (eight consecutive logic 1's), and then advances to either mark idle state 120 or flag idle state 121, as selected. If the transmitter is commanded by external device 9 to enter abort state 124 the transmitter will immediately advance to abort state 124 and begin sending the abort character without waiting to send or complete sending any data it has received from UART 18, the FCS, or any flags.

The BSC transmitter is similar to the HDLC/SDLC transmitter except: (1) there is not state 123; (2) when a transmit FIFO buffer underrun occurs the BSC transmitter sends the transmit FIFO buffer empty signal and then advances to state 120 or state 121, as selected; and (3) in state 121 the BSC transmitter sends the BSC sync characters 110, 111.

FIG. 5 is a state diagram of the HDLC/SDLC receiver. The HDLC/SDLC receiver also has five states: hunt for flag 130, flag sync 131, address 132, data 133, and end-of-frame 134. A receiver reset command 129 causes the receiver to enter hunt state 130.

In hunt state 130 the receiver scans the incoming data on input P27 from modem engine 60 in search of a flag character. Once a flag character is detected the receiver advances to flag sync state 131.

In flag sync state 131 the receiver has detected one or more flag characters and has achieved character synchronization. The receiver remains in this state until a non-flag character is detected. If the non-flag character contains seven or more consecutive logic 1 bits, as in the mark idle character, then the receiver returns to hunt state 130. If the non-flag character has less than seven consecutive logic 1 bits then the receiver assumes that it is the first character of address field 102 and the receiver enters address state 132.

Upon entering address state 132 the receiver presets the receive FCS generator to all logic 1's. If the receiver has been programmed for address recognition, the receiver compares the received address character with the programmed address; and also with the "broadcast" address (binary value 11111111). If the received address character does not match either the programmed address or the broadcast address then the receiver returns to hunt state 130. If the received address character matches either the programmed address or the broadcast address, or if the receiver was not programmed for address recognition, then the receiver advances to data state 133.

In data state 133 the receiver continuously accepts the serial received data stream from modem engine 60, performs zero-bit deletion as required, collects the bits for a complete character, and places the completed character into the received data FIFO buffer for transmission to UART 18. The receiver advances to end-of-frame state 134 when it detects that a completed character is a flag character. If the receiver detects that the serial received data stream from modem engine 60 contains seven or more logic 1 bits, the receiver interprets this as an abort condition, switches to hunt state 130, and sets the abort status bit in the receiver status register to a logic 1.

Once the receiver has entered end-of-frame state 134 the 16-bit received FCS is compared with the contents of the receive FCS generator. The 16-bit received FCS is also placed into the received data FIFO buffer. The result of the comparison (FCS good or FCS bad) and the end-of-frame indicator is placed into the receiver status word. The receiver status word is then placed, with an inverted parity bit, into the received data FIFO buffer for transmission to UART 18. The receiver then returns to flag sync state 131.

The BSC receiver is similar to the HDLC/SDLC receiver except: (1) there is no address state 132 so the BSC receiver advances directly to data state 133; (2) there is no end-of-frame state 134 so taht BSC receiver stays in data state 133 until it is reset and then re-enters hunt state 130; (3) in hunt state 130, the BSC receiver is searching for two sync characters 110 and 111; and (4) the BSC receiver advances from flag sync state 131 to data state 133 when it detects that sync characters 110 and 11 are followed by non-sync characters (data 112, CRC 113, or PAD 114).

Input/Output Registers

When in the asynchronous command state, external device 9 sends instructions and reads status information via sixteen 8-bit registers. These registers are called: transmitter holding register (THR), receiver buffer register (RBR), async register A (ARA), async register B (ARB), interrupt enable register (IER), interrupt identification register (IIR), line control register (LCR), modem control register (MCR), line status register (LSR), BSC synchronization character register (BSCR), modem status register (MSR), HDLC/SDLC station address register (SAR), divisor latch registers (DLL and DLM), modem engine rate register (MERR), and options register (OR). Register THR is a write-only register. Registers RBR and IIR are read-only registers. The other registers listed above are read/write registers. Registers BSCR, SAR and OR are only used for synchronous operation.

Registers THR, RBR, IER, IIR, LCR, MCR, LSR, DLL, DLM, and MSR are in UART 18. The other registers are in processor 47. It will be appreciated from the discussion above and from an understanding of UART 18 that some of the register meanings listed below apply only to the asynchronous mode, some apply only to the synchronous mode, and some apply to both modes.

Register THR is the input register of the UART 18 transmitter. In synchronous mode, writing a character to this register initiates the transmission of a frame. The character will be transmitted once it is transferred to the transmitter of processor 47 and exits the transmit data FIFO buffer.

Register RBR is the output register of the UART 18 receiver. Each time a received character reaches register RBR a received data available interrupt is generated unless this interrupt has been masked by register IER.

Register IER enables/disables interrupts from the following conditions: received data available; register THR is empty; modem status changes; and line status changes.

Register IRR provides for prioritization of interrupts. In the preferred embodiment there are four levels of interrupt priority: 1—line status; 2—received data available; 3—register THR empty; and 4—modem status. The line status events are: received data available in register RBR, parity error in received data, register RBR overrun, received break interrupt, register THR empty, framing error, received end-of-frame sequence, FCS check result, and UART 18 has no data to send to processor 47. The modem status events are a change in state of any of the following signals: CTS on conductor 45, DCD on conductor 46, and RI conductor 40. Register IIR, when addressed, freezes the highest priority interrupt pending and no other interrupts are acknowledged until the highest priority interrupt is serviced by external device 9.

Register LCR provides for word select length, number of stop bits, parity selection, divisor latch address bit selection, transmitter reset, receiver reset, UART 18 register addressing, and HDLC/SDLC transmit abort instructions. A transmitter reset instruction immediately resets the transmitter to the mark idle state 120, or the flag idle state 121, depending upon the state selected in register OR. Once the transmitter reset operation is completed this instruction is automatically cleared. A receiver reset instruction immediately resets the receiver to hunt state 130. Once the receiver reset operation is completed, this instruction is automatically cleared. An HDLC/SDLC transmit abort instruction causes the transmitter to immediately transmit the abort character and enter mark idle state 120 or flag idle state 121, as selected by register OR. Once the abort character has been transmitted and the transmitter enters the assigned idle state this instruction is automatically cleared.

Register MCR controls the following: the DTR signal on conductor 36; the RTS signal on conductor 37; the OUT1 signal on conductor 32; the OUT2 signal on conductor 27; and UART 18 loopback.

Register LSR indicates the line status events shown above. Register BSCR contains the eight bit synchronization character for BSC operation. Register MSR indicates the modem status events shown above. Register SAR contains the station address for external device 9 in HDLC/SDLC communications.

Registers DLL and DLM set the data rate for SIN and SOUT of UART 18. This data rate is 9600 bps in the synchronous mode, and is the desired data rate (150, 300, 600, etc. bps) in the synchronous command mode and the asynchronous data mode.

Registers ARA and ARB set the data rate for P30 and P37 of processor 47 to match the data rate of SIN and SOUT of UART 18. This data rate is 9600 bps in the synchronous mode, and is the desired data rate (150, 300, 600, etc. bps) in the asynchronous command mode and the asynchronous data mode.

Register MERR sets the data rate for P20 and P27 of processor 47 and the data rate for TXD, RXD, CTXD and CRXD of modem engine 60. This data rate is the data rate required for communications with remote device 100.

Register OR selects the asynchronous or synchronous mode, selects BSC or HDLC/SDLC communications, enables or disables HDLC/SDLC address recognition, selects NRZ or NRZI encoding, and selects mark idle or flag/sync idle.

Control and Monitoring

Processor 47 controls and monitors the operation of modem engine 60 through the read, negated write, and control inputs and the bidirectional data inputs/outputs (D0-D7) of modem engine 60. Processor 47 controls, for example, the following parameters of operation of modem engine 60: data rate, auto answer enable, analog loopback, character length selection, dual tone multiple frequency (DTMF) dialing, pulse dialing, guard tone enable, receive long space disconnect, etc. Processor 47 also monitors, for example, the following parameters of operation of modem engine 60: dial digit register is empty, ring indicator, receive carrier detected, tone detect, etc.

Processor 47 must communciate changes in the monitored operation of modem engine 60 to external device 9. However, processor 47 can only communicate with external device 9 through UART 18. Therefore, both received data words and status words generated by processor 47 pass through UART 18. External device 9 must have a method of determining whether a word placed on bus 10 by UART 18 is a received data word or a status word.

It will be recalled that, in the synchronous mode, processor 47 adds start, stop, and parity bits to words it sends to UART 18. In order to distinguish data words from status words, processor 47 inverts the parity bits on status words. The inverter parity bit causes UART 18 to generate an interrupt. When external device 9 services the interrupt it will read the status register of UART 18 and determine that a parity error has occurred. This parity error alerts external device 9 that the next word will be a status word from processor 47 and not a received data word.

When in the synchronous mode, all words sent by external device 9 to processor 47 through UART 18 are treated as transmit data words and not as instructions. Therefore, in order to send instructions to processor 47, external device 9 instructs UART 18 to place a logic 0 on the negated data terminal ready (DTR) conductor 36. A logic 0 on conductor 36 causes processor 47 to exit the synchronous mode and enter the asynchronous command mode.

Once processor 47 is placed in the asynchronous command mode it treats all words from UART 18 as instructions from external device 9 until it receives an instruction to enter the synchronous mode or the asynchronous data mode.

When processor 47 is in the asynchronous command state it places a logic 1 on both conductors 53 and 54. This causes multiplexer 56 to connect its X3 input to its X output and its Y3 input to its Y output. Since the Y3 input of multiplexer 56 is connected to a logic 1, a logic 1 is placed on the CTXD input of modem engine 60. This causes modem engine 60 to send the mark/idle condition to remote device 100.

Multiplexer 56 also connects the CRXD output of modem engine 60 to the received data input of processor 47. In the preferred embodiment, processor 47 ignores the received data when in the asynchronous command mode. However, there may be some applications whereby it is desirable from processor 47 to act on or pass on the received data stream even if processor 47 is in the asynchronous command state.

If processor 47 places a logic 1 on conductor 53 and a logic 0 on conductor 54, multiplexer 56 will connect its X2 input to its X output, and its Y2 input to its Y output. This causes received data from modem engine 60 to go directly to UART 18, and causes transmit data to flow from UART 18, through processor 47, and then to modem engine. This condition is not used in the preferred embodiment but is provided in the event that an application should arise whereby it is desirable that transmit data be processed in some manner by processor 47 before it is sent to modem engine 60 for transmission to remote device 100.

In some applications it may be desirable to be able to send instructions to processor 47 without having to first cause processor 47 to exit the synchronous mode. Therefore, processor 47 looks at the transmit words coming from UART 18. If the transmit word is a "DLE" character, this advises processor 47 that the next word is an instruction word, and not a data word for transmissions. However, if two DLE characters are received in sequence, processor 47 will interpret this as an instruction to send a DLE character, that is, to delete the first DLE character and to send the second DLE character to modem engine 60. This provides a means of sending a DLE character as part of the transmit data stream.

Similarly, if the particular application requires that the UART 18 interrupt not be used to indicate a status word, processor 47 will insert the DLE character, followed immediately by the status word, into the received data stream being sent to UART 18. When external device 9 detects the DLE character, it will treat the next word as a status word. Processor 47 also monitors the incoming received data stream from modem engine 60. If processor 47 detects a DLE character in the received data stream it will inject, immediately after the first DLE character, a second DLE character into the received data stream to UART 18. External device 9 will recognize that two sequential DLE characters represents one DLE character in the received data stream.

From the foregoing description of the preferred embodiment, other embodiments of the present invention will suggest themselves to those skilled in the art. Therefore, the scope of the present invention is to be limited only the claims below.

We claim:

1. Apparatus for interfacing a modem engine to an external data device for conducting both synchronous and asynchronous transmission, comprising:

an asynchronous communications element connected to said data device responsive to a first data word from said data device for providing a first serial output word, said first serial output word comprising at least one start bit, said first data word, at least one parity bit, and at least one stop bit;

processing means connected to said asynchronous communications element and responsive to said first serial output word for determining whether said first serial output word is a command word or a data word, if said first serial output word is a command word, for providing a first output signal and, alternatively, if said first serial output word is a data word, for providing a second serial word, said second serial word including said first data word; and said modem engine comprising modem engine means connected to said processor and responsive to said first output signal and to said second serial word for providing a modulated serial output word, said modulated serial output word corresponding to said second serial word in a synchronous data format specified by said command word.

2. Apparatus as recited in claim 1 wherein:
said command word is one of a predetermined plurality of command words including an asynchronous command word and a synchronous command word; and
said processor means includes means for selectively connecting the output of said asynchronous communications element directly to said modem engine in response to said asynchronous command word and alternately for connecting an output of said processor directly to said modem engine and connecting said output of said asynchronous communications element to an input of said processor in response to said synchronous command word.

3. A synchronous and asynchronous data transmitter responsive to an outgoing data signal, said outgoing data signal selectively containing a first instruction or a second instruction, comprising:
first data conversion means responsive to said outgoing data signal for providing a first serial data signal by converting said outgoing data signal from a parallel data format to an asynchronous serial data format;
second data conversion means connected to said first data conversion means and responsive to said first instruction in said first serial data signal for providing a second serial data signal by leaving said first serial data signal in said asynchronous serial data format and, responsive to said second instruction in said first serial data signal, for providing said second serial data signal by converting said first serial data signal from said asynchronous serial data format into a synchronous serial data format; and
modulation means connected to said data conversion means and responsive to said second serial data signal for providing a transmitted data signal by modulating a carrier with said second serial data signal.

4. The synchronous and asynchronous data transmitter of claim 3 wherein said first data conversion means comprises the transmitter portion of a universal-asynchronous-receiver-transmitter.

5. The synchronous and asynchronous data transmitter of claim 3 wherein said second data conversion means comprises a microprocessor for selectably converting said first serial data signal from said asynchronous serial data format into said synchronous serial data format.

6. The synchronous and asynchronous data transmitter of claim 5 wherein said microprocessor selectably provides a multiplexer control signal and said second data conversion means further comprises a multiplexer responsive to said multiplexer control signal for providing said second serial data signal by selectably passing said first serial data serial in said asynchronous serial data format or, alternatively, passing said first serial data signal in said synchronous serial data format.

7. The synchronous and asynchronous data transmitter of claim 3 wherein said modulation meand comprises a modem engine transmitter.

8. The synchronous ans asynchronous data transmitter of claim 3 wherein said first instruction comprises a predetermined character.

9. The synchronous and asynchronous data transmitter of claim 8 wherein said predetermined character is the data link escape (DLE) character.

10. The synchronous and asynchronous data transmitter of claim 3 wherein said second instruction comprises a predetermined character.

11. A synchronous and asynchronous data receiver for use with an external data device, said external data device being capable of selectably providing a first control signal or a second control signal, comprising:
demodulation means responsive to a received data modulated signal for providing a first serial data signal by demodulating said received data modulated signal to recover the data contained therein, said first serial data signal being in either an asynchronous serial data format or a synchronous data format;
first data conversion means connected to said demodulation means and responsive to said first control signal for providing a second serial data signal by leaving said first serial data signal in said asynchronous serial data format and responsive to said second control signal for providing said second serial data signal by converting said first serial data signal from said synchronous serial data format to said asynchronous serial data format; and
second data conversion means connected to said first data conversion means and responsive to said second serial data signal for providing an incoming data signal to said external data device by converting said second serial data signal from serial data format to a parallel data format.

12. The synchronous and asynchronous data receiver of claim 11 wherein said demodulation means comprises a modem engine.

13. The synchronous and asynchronous data receiver of claim 11 wherein said first data conversion means comprises a microprocessor for selectably converting said first serial data signal from said synchronous serial data format to said asynchronous serial data format.

14. The synchronous and asynchronous data receiver of claim 13 wherein said microprocessor selectably provides a multiplexer control signal and said first data conversion means further comprises a multiplexer responsive to said multiplexer control signal for providing said second serial data signal by selectably passing said first serial data signal in said asynchronous serial data format or, alternatively, passing said first serial data signal which has been converted from said synchronous serial data format to said asynchronous serial data format.

15. The synchronous and asynchronous data receiver of claim 11 wherein said second data conversion means comprises the receiver portion a universal-asynchronous- receiver-transmitter.

16. The synchronous and asynchronous data receiver of claim 11 wherein said second control signal is the inverse of said first control signal.

17. A synchronous and asynchronous data transmitter/receiver, comprising:
first data conversion means for providing a first serial data signal by converting an outgoing data signal from a parallel data format into an asynchronous serial data format, and for providing an incoming data signal by converting a second serial data signal from said asynchronous serial data format into said parallel data format;
second data conversion means connected to said first data conversion means, responsive to a first instruction in said first serial data signal for providing a third serial data signal by leaving said first serial data signal in said asynchronous serial data format, and for providing said second serial data signal by leaving a fourth serial data signal in said asynchronous serial data format, and responsive to a second instruction in said first serial data signal for providing said third serial data signal by converting said first serial data signal from said asynchronous serial data format into a synchronous serial data format, and for providing said second serial data signal by converting said fourth serial data signal from said synchronous serial data format into said asynchronous serial data format; and modulation/demodulation means connected to said second data conversion means, responsive to said third serial data signal for providing a transmitted data signal by modulating a carrier with said third serial data signal, and responsive to a received data modulated signal for providing said fourth serial data signal by demodulating said received data modulated signal to recover the data, said fourth serial data signal being in either said asynchronous serial data format or said synchronous serial data format.

18. The synchronous and asynchronous data transmitter/receiver of claim 17 wherein said first data conversion means comprises a universal-asynchronous-receiver-transmitter.

19. The synchronous and asynchronous data transmitter/receiver of claim 17 wherein said second data conversion means comprises a microprocessor for selectably converting said first serial data signal from said asynchronous serial data format to said synchronous serial data format and for selectably converting said fourth serial data signal from said synchronous serial data format to said asynchronous serial data format.

20. The synchronous and asynchronous data transmitter/receiver of claim 19 wherein said microprocessor provides a multiplexer control signal and said second data conversion means further comprises a multiplexer responsive to said multiplexer control signal for providing said third serial data signal by selectively passing said first serial data signal in said asynchronous serial data format or, alternatively, passing said first serial data signal which has been converted from said asynchronous serial data format to said synchronous serial data format, and for providing said second serial data signal by selectably passing said fourth serial data signal in said asynchronous serial data format, or, alternatively, passing said fourth serial data signal which has been converted from said synchronous serial data format to said asynchronous serial data format.

21. The synchronous and asynchronous data transmitter/receiver of claim 17 wherein said modulation/demodulation means comprises a modem engine.

22. The synchronous and asynchronous data transmitter/receiver of claim 17 wherein said second serial data signal comprises a plurality of data words, each of said data words having a parity bit, and wherein said second data conversion means inserts a status word into said second serial data signal, said status word comprising at least one said data word with an inverted parity bit.

23. The synchronous and asynchronous data transmitter/receiver of claim 17 wherein said first instruction comprises a predetermined character.

24. The synchronous and asynchronous data transmitter/receiver of claim 23 wherein said predetermined character is the data link escape (DLE) character.

25. The synchronous and asynchronous data transmitter/receiver of claim 17 wherein said second instruction comprises a predetermined character.

26. The synchronous and asynchronous data transmitter/receiver of claim 17 wherein said predetermined character is the data link escape (DLE) character.

27. A synchronous and asynchronous data transmitter for use with an external data device, said external data device providing an outgoing data signal, comprising:

data conversion means responsive to a first instruction in said outgoing data signal, said outgoing data signal being in an asynchronous serial data format, for providing a serial data signal by leaving said outgoing data signal in said asynchronous serial data format and, alternatively, responsive to a second instruction in said outgoing data signal for providing said serial data signal by converting said outgoing data signal from said asynchronous serial data format into a synchronous serial data format; and modulation means connected to said data conversion means and responsive to said serial data signal for providing a transmitted data signal by modulating a carrier with said serial data signal.

28. The synchronous and asynchronous data transmitter of claim 27 wherein said data conversion means comprises a microprocessor for selectably converting said outgoing data signal from said asynchronous serial data format to said synchronous serial data format.

29. The synchronous and asynchronous data transmitter of claim 28 wherein said microprocessor provides a multiplexer control signal and said data conversion means further comprises a multiplexer responsive to said multiplexer control signal for providing said serial data signal by selectably passing said outgoing serial data signal in said asynchronous serial data format or, alternativley, passing said serial data signal which has been converted from said asynchronous serial data format to said synchronous serial data format.

30. The synchronous and asynchronous data transmitter of claim 27 wherein said modulation means comprises a modem engine.

31. The synchronous and asynchronous data transmitter of claim 27 wherein said first instruction comprises a predetermined character.

32. The synchronous and asynchronous data transmitter of claim 31 wherein said predetermined character is the data link escape (DLE) character.

33. The synchronous and asynchronous data transmitter of claim 27 wherein said second instruction comprises a predetermined character.

34. The synchronous and asynchronous data transmitter of claim 33 wherein said predetermined character is the data link escape (DLE) character.

35. A synchronous and asynchronous data receiver for use with an external data device, said external data device being capable of selectably providing a first control signal or a second control signal, comprising:

demodulation means responsive to a received data modulated signal for providing a serial data signal by demodulating said received data modulated signal to recover the data contained therein, said serial data signal being in either an asynchronous serial data format or a synchronous serial data format; and data conversion means connected to said demodulation means responsive to said first control signal for providing an incoming data signal to said external data device by leaving said serial data signal in said asynchronous serial data format, and, alternatively responsive to said second control signal for providing said incoming data signal by converting said serial data signal from said synchronous serial data format to said asynchronous serial data format.

36. The synchronous and asynchronous data receiver of claim 35 wherein said demodulation means comprises a modem engine.

37. The synchronous and asynchronous data receiver of claim 35 wherein said data conversion means comprises a microprocessor for selectably converting said serial data signal from said synchronous serial data format to said asynchronous serial data format.

38. The synchronous and asynchronous data receiver of claim 37 wherein said microprocessor provides a multiplexer control signal and data conversion means further comprises a multiplexer responsive to said multiplexer control signal for providing said incoming data signal by selectively passing said serial data signal in said asynchronous serial data format or, alternatively, by passing said serial data signal which has been converted from said synchronous serial data format to said asynchronous serial data format.

39. The synchronous and asynchronous data receiver of claim 35 wherein said second control signal is the inverse of said first control signal.

40. A synchronous and asynchronous data transmitter/receiver for use with an external data device, said external data device for providing an outgoing data signal and for receiving an incoming data signal, comprising:
   data conversion means responsive to a first instruction in said outgoing data signal, said outgoing data signal being in an asynchronous serial data format, for providing a first serial data signal by leaving said outgoing data signal in said asynchronous serial data format and for providing said incoming data signal by leaving a second serial data signal in said asynchronous serial data format and, alternatively, responsive to a second instruction in said outgoing data signal for providing said first serial data signal by converting said outgoing data signal from said asynchronous serial data format into a synchronous serial data format, and for providing said incoming data signal by converting said second serial data signal from said synchronous serial data format to said asynchronous serial data format, said second serial data signal being in either said asynchronous serial data format or said synchronous serial data format; and
   modulation/demodulation means connected to said data conversion means, and responsive to said first serial data signal for providing a transmitted data signal by modulating a carrier with said first serial data signal, and responsive to a received data modulated signal for providing said second serial data signal by demodulating said received data modulated signal.

41. The synchronous and asynchronous data transmitter/receiver of claim 40 wherein said modulation/demodulation means comprises a modem engine.

42. The synchronous and asynchronous data transmitter/receiver of claim 40 wherein said data conversion means comprises a microprocessor for selectably converting said second serial data signal from said asynchronous serial data format to said synchronous serial data format and converting said outgoing serial data signal from said asynchronous serial data format into said synchronous serial data format.

43. The synchronous and asynchronous data transmitter/receiver of claim 42 wherein said microprocessor provides a multiplexer control signal and said data conversion means further comprises a multiplexer responsive to said multiplexer control signal for providing said first serial data signal by selectively passing said outgoing data signal in said asynchronous serial data format or, alternatively, passing said outgoing data signal which has been converted from said asynchronous serial data format into said synchronous data format, and for providing said incoming data signal by passing said second serial data signal in said asynchronous serial data format or, alternatively, passing said second serial data signal which has been converted from said synchronous serial data format into said asynchronous serial data format.

44. The synchronous and asynchronous data transmitter/receiver of claim 40 wherein said incoming data signal comprises a plurality of data words, each of said data words having a parity bit, and wherein said data conversion means inserts a status word into said incoming data signal, said status word comprising at least one said data word with an inverted parity bit.

45. The synchronous and asynchronous data transmitter/receiver of claim 40 wherein said first instruction comprises a predetermined character.

46. The synchronous and asynchronous data transmitter/receiver of claim 45 wherein said predetermined character is the data link escape (DLE) character.

47. The synchronous and asynchronous data transmitter/receiver of claim 40 wherein said second control signal is the inverse of said first control signal.

48. The synchronous and asynchronous data transmitter/receiver of claim 40 wherein said second instruction comprises a predetermined character.

49. The synchronous and asynchronous data transmitter/receiver of claim 48 wherein said predetermined character is the data link escape (DLE) character.

50. A serial data format converter for selectably passing an input serial data stream in a first data format or converting said input serial data stream into a second data format, comprising:
   processing means responsive to a first instruction in said input serial data stream for providing a first control signal and, alternatively, responsive to a second instruction in said input serial data stream for providing a second control signal and for providing a converted data stream by converting said input serial data stream from said first data format into said second data format; and
   data selection means comprising a first input connected to said input serial data stream, a second input connected to said processing means, a control input connected to said processing means, and an output, and responsive to said first control signal for providing an output serial data stream in said first data format by passing said input serial data stream from said first input to said output and, alternatively, responsive to said second control signal for providing said output serial data stream in said second data format by passing said converted data stream from said second input to said output.

51. The serial data format converter of claim 50 wherein said processing means comprises a microprocessor for selectably converting said input serial data stream from said first data format into said second data format.

52. The serial data format converter of claim 50 wherein said data selection means comprises a multiplexer for selectively passing said input serial data stream or said converted data stream.

53. The serial data format converter of claim 50 wherein said input serial data stream comprises a plurality of data words, each of said data words having a parity bit, and said first instruction comprises at least one of said data words with an inverted parity bit.

54. The serial data format convertor of claim 50 wherein said first instruction comprises a predetermined character.

55. The serial data format converter of claim 54 wherein said predetermined character is the data link escape (DLE) character.

56. The serial data format convertor of claim 50 wherein said second control signal is the inverse of said first control signal.

57. The serial data format convertor of claim 50 wherein said first data format is an asynchronous serial data format.

58. The serial data format converter of claim 57 wherein said second data format is a synchronous serial data format.

59. A bidirectional serial data format converter for selectably passing a first input serial data stream and a second input serial data stream in a first data format or converting said first input serial data stream from said first data format into a second data format and said second input serial data stream from second data format into said first data format, comprising:
  processing means responsive to a first instruction in said first input serial data stream for providing a first control signal and, alternatively, responsive to a second instruction in said first input serial data stream for providing a second control signal, for providing a first converted data stream by converting said first input serial data stream from said first data format into said second data format, and for providing a second converted data stream by converting said second input serial data stream from said second data format into said first data format; and
  data selection means comprising a first input connected to said first input serial data stream, a second input connected to said processing means, a third input connected to said second input serial data stream, a fourth input connected to said processing means, a control input connected to said processing means, a first output, and a second output, and responsive to said first control signal for providing a first output serial data stream in said first data format by passing said first input serial data stream from said first input to said first output and a second output serial data stream in said first data format by passing said second input serial data stream from said third input to said second output and, alternatively, responsive to said second control signal for providing said first output serial data stream in said second data format by passing said first converted data stream from said second input to said first output, and for providing said second output serial data stream in said first data format by passing said second converted data stream from said fourth input to said second output.

60. The bidirectional serial format converter of claim 59 wherein said processing means comprises a microprocessor for selectably converting said first input serial data stream from said first data format to said second data format and converting said second input serial data stream from said second data format into said first data format.

61. The bidirectional serial format convertor of claim 59 wherein said data selection means comprises a two-channel multiplexer.

62. The bidirectional serial format converter of claim 59 wherein said first instruction comprises a predetermined character.

63. The bidirectional serial format converter of claim 62 wherein said predetermined character is the data link escape (DLE) character.

64. The bidirectional serial format convertor of claim 59 wherein said second control signal is the inverse of said first control signal.

65. A bidirectional serial format convertor of claim 59 wherein said first data format is an asynchronous serial data format.

66. The bidirectional serial format convertor of claim 59 wherein said second data format is a synchronous serial data format.

67. The bidirectional serial format convertor of claim 59 wherein said second instruction comprises a predetermined character.

68. The bidirectional serial format convertor of claim 67 wherein said predetermined character is the data link escape (DLE) character.

69. The bidirectional serial format convertor of claim 59 wherein said processing means is further responsive to a plurality of instructions for changing the operating parameters of said processing means.

70. The bidirectional serial format convertor of claim 69 wherein said operating parameters comprise the bit rate.

71. The bidirectional serial format converter of claim 70 wherein said first input serial data stream and said second converted data stream comprise a plurality of data words, each of said data words having a parity, and said operating parameters further comprise the parity selected.

72. In a method of operating a system whereby information data is exchanged between devices by encoding said information data as an information data word, said information data word being characterized by a first predetermined parity, and transferring said information data as a series of data words, said series of data words comprising a plurality of said information data words, a method for exchanging status data between said devices, comprising:
  a transmitting procedure comprising:
    (a) encoding said status data as a status data word wherein said status data word is characterized by a second predetermined parity; and
    (b) inserting said status data word into said series of data words; and
  a receiving procedure comprising:
    (c) inspecting the parity of each data word in said series of data words; and
    (d) processing each said data word having said second predetermined parity as one of said status data words.

73. In a method of operating a system comprising a data set and a data terminal, a first port of said set being connected to a first port on said data terminal, said data set and said data terminal communicating through said first ports by means of an asynchronous serial data interface, said data set also having a second port usable for synchronous communications with an external device, said data set being operable in at least either a synchronous data mode or an asynchronous command mode, said asynchronous serial data interface having a clear-to-send line, a data-terminal-ready line, a ready-to-send line, and a ring indicator line, a method of using said asynchronous serial data interface to control the mode of said data set and to regulate the flow of data between said data set and said data terminal, comprising:

using the clear-to-send line to indicate that said data set is ready to accept data from said data terminal;

using the data-terminal-ready line to cause said data set to exit said synchronous data mode and then enter said asynchronous command mode;

using the ready-to-send line to cause a synchronous data receiver in said data set to enter a hunt state; and using the ring indicator line to advise said data terminal that said data set is sending an end-of-frame sequence from said second port.

* * * * *